(12) United States Patent
Rothacker

(10) Patent No.: US 6,602,927 B1
(45) Date of Patent: Aug. 5, 2003

(54) POLYISOCYANURATE FOAMS

(75) Inventor: Andreas Rothacker, Hoeilaart (BE)

(73) Assignee: Huntsman International LLC, Salt Lake City, UT (US)

(*) Notice: Subject to any disclaimer, the term of this patent is extended or adjusted under 35 U.S.C. 154(b) by 0 days.

(21) Appl. No.: 09/677,839

(22) Filed: Oct. 2, 2000

Related U.S. Application Data

(63) Continuation of application No. PCT/EP99/02261, filed on Apr. 1, 1999.
(60) Provisional application No. 60/080,541, filed on Apr. 3, 1998, and provisional application No. 60/094,396, filed on Jul. 28, 1998.

(51) Int. Cl.[7] .................................................. C08J 9/06
(52) U.S. Cl. ...................... 521/130; 521/128; 521/131; 521/155; 521/170; 521/172; 521/174
(58) Field of Search ................................ 521/128, 130, 521/131, 155, 170, 172, 174

(56) References Cited

U.S. PATENT DOCUMENTS

| 5,025,039 A | * | 6/1991 | Neuhaus et al. ............. 521/130 |
| 5,162,385 A | | 11/1992 | Hartwig et al. ............. 521/118 |
| 5,700,869 A | * | 12/1997 | Turnbach ..................... 521/174 |
| 5,716,548 A | * | 2/1998 | Harrison et al. ............. 521/130 |
| 6,245,826 B1 | * | 6/2001 | Wilson et al. ............... 521/130 |

FOREIGN PATENT DOCUMENTS

| DE | 43 25 014 A1 | 7/1993 |
| EP | 0 409 199 A2 | 1/1991 |

* cited by examiner

*Primary Examiner*—John M. Cooney, Jr.
(74) *Attorney, Agent, or Firm*—Nicole Peffer

(57) ABSTRACT

The invention provides polyisocyanurate systems for manufacture of polyisocyanurate foam components such as those from SRIM processes. The reaction systems include a polyisocyanate and a polyisocyanate reactive component that includes a trimerization catalyst, polyol, and a carboxylic acid blowing agent, optionally with water as a co-blowing agent. The reaction systems can be blown exclusively with carboxylic acid to produce SRIM products which can be demolded with reduced mold residence time.

25 Claims, No Drawings

POLYISOCYANURATE FOAMS

This application is a continuation of international application number PCT EP99 02261, filed Apr. 1, 1999, which claims benefit of Ser. No. 60,080,541 filed Apr. 3, 1998 which claims benefit of Ser. No. 60,094,396 filed Jul. 28, 1998.

FIELD OF THE INVENTION

The present invention relates to polyisocyanurate foams, to compositions used in the preparation of such foams and to molded articles prepared from such foams.

BACKGROUND OF THE INVENTION

Molded cellular and noncellular foam articles have found many applications in the automotive and building industries. Illustrative automotive applications include the use of such foams in articles as consoles, door panels, pillars and seat backs. Examples of non-automotive uses include modular housing and shower supports and doors. Although many foam parts are produced by reaction injection molding processes (RIM), woven or non-woven fiber reinforcements are known to provide the foam parts with greater tensile strength and flexural modulus. Such molding processes are known as structural reaction injection molding (SRIM) processes.

SRIM processes generally entail pouring or injecting of a liquid foam composition into a closed or open mold which, if open, is subsequently closed during the foaming reaction. Prior to the pouring in of the liquid foam composition, reinforcing fiberglass mats and/or other suitable plastic reinforcing parts can be placed in the open mold. In some cases, a cosmetic facing or cover stock material is initially laid in the open mold prior to the placement of the reinforcing materials and/or liquid foaming composition. When such cover stock materials are used, and the liquid foam composition is subsequently poured into the partially filled mold, the process is known as a back filling or pour-behind SRIM process.

Although SRIM molders are faced with problems unique to their particular processes, they are also faced with the problems attendant to any traditional polyurethane molding process. In any molding operation, efficiency and cost considerations mandate that the length of time required to make each part be minimized as much as possible. As a result, it is highly desirable that each part be removed from the mold as rapidly and as easily as possible. However, those skilled in the art will appreciate that molded polyurethane parts tend to require long mold residence times. Long mold residence time is highly disadvantageous since it adds significantly to the per part cost.

Polyurethane foams have been used in a variety of applications including pour behind foamed rigid fiber reinforced structural composites made by reaction injection molding (LD-SRIM). In these applications, the foam forming components are introduced into a mold, foamed in the mold and removed as the finished part. The mold may contain a fibrous mat reinforcement. In these processes it is beneficial to have as short a mold residence time as possible to increase productivity. In addition, little or no post mold expansion is necessary to prevent manufacture of defective parts.

The methods of the prior art to reduce the residence time of LD-SRIM manufactured parts has focused on modifications to polyurethane formulations. These methods have been deficient, however, because the high exotherm temperatures exceed the initial softening point of the immature polymer.

A need therefore continues to exist for foam formulations which have particular utility in LD-SRIM applications and which can be molded with minimal residence time.

SUMMARY OF THE INVENTION

The disclosed invention relates to reaction system for polyisocyanurate foams. The reaction system includes a polyisocyanate component, and a polyisocyanate reactive component. The polyisocyanate reactive component can include a polyol, a carboxylic acid, water, a trimerization catalyst and other additives. The polyisocyanate may be any of aliphatic polyisocyanates, cycloaliphatic polyisocyanates, aralaliphatic polyisocyanates, aromatic polyisocyanates, and mixtures of isocyanates and polyisocyanates modified by introduction of at least one of urethane, allophanate, urea, biuret, carbodiimide, uretonimine, or isocyanurate residues. The carboxylic acid component is a substituted or unsubstituted carboxylic acid or partial esters thereof selected from the group consisting of aliphatic carboxylic acids, aromatic carboxylic acids, heterocyclic carboxylic acids. The trimerization catalyst is any of potassium hydroxide, potassium hydroxide with fatty acid, and soluble alkali metal carboxylates, or mixtures thereof.

The polyisocyanurate reaction systems disclosed herein can be molded in SRIM and LD-SRIM with minimal mold residence time, especially when compared to polyurethane systems. The polyisocyanurate reactions systems can provide significant advantages such as decreased cycle time. Other benefits include higher glass transition temperature, reduced post mold expansion, higher heat deflection temperature, and easier mold removal.

Having summarized the invention, the invention will now be described in detail as set forth in the following description and non-limiting examples.

DETAILED DESCRIPTION OF THE INVENTION

Glossary: The following tradename materials are defined below:

Dabco 8800: delayed action gelation catalyst from Air Products.

Dabco K-15: Potassium 2-ethylhexanoate, at 15% by weight in DEG Trimerization catalyst from Air Products.

Daltorez P-716: polyester diol; poly-[(ethylene, diethylene)-adipate]; hydroxyl value=56; MW of about 2000, and a nominal functionality of 2.0, from ICI Americas.

DEG: diethylene glycol.

Jeffamine T-5000: glyceryl poly(oxypropylene) triamine, 5000 MW, functionality=3, from Huntsman Petrochemical. The amine groups are primary aliphatic.

Kemester 5721: Tridecyl Stearate from Witco Chemicals.

Loxiol G-71S: a complex fatty polyester that is the reaction product of adipic acid, pentaerythritol and oleic acid, from Henkel Corporation.

Niax L-1000: polyalkylene oxide methyl siloxane copolymer from Witco (OSI)

Niax L 5420: polyalkylene oxide methyl siloxane copolymer from Witco (OSI)

Niax L 6980: polyalkylene oxide methyl siloxane copolymer from Witco (OSI)

Poly G-55-173: polyether polyol from Olin Chemical

Polycat DBU: diazabicycloundecene catalyst from Air Products

Pripol 1013: a polymerized fatty trimer acid, nominal functionality=2 from Uniqema.

Pripol 1040: a polymerized fatty dimer acid, nominal functionality=3 from Uniqema.

Priolube 1414: isobutyl oleate esterbof commercial grade oleic acid

Rubinol R-015: triol; propoxylated glycerol; hydroxyl value=650 from ICI Americas Rubinol R-180: propoxylated sucrose/diethylene glycol mixture (approximately 72:28 w/w of the propoxylated products); overall hydroxyl value=440; number average functionality=6.42 from ICI Americas Rubinol F 435: primary hydroxyl terminated polyether polyol with a hydroxyl value of 35 and a nominal functionality of 3; from ICI Americas.

Rubinol-F-455: primary hydroxyl terminated 3000 MW triol from ICI Americas

Rubinol F-459: oxypropylated dipropylene glycol with 20.7% by weight ethylene oxide as cap; hydroxyl value=30; diol from ICI Americas Rubinate 1680: uretonimine-modified 4,4' MDI to final NCO content of 29.3%; liquid at ambient temperature; from ICI Americas Rubinate 1790: prepolymer of 4,4'-MDI with mixture of low MW glycols (TPG; 1,3-BDO, and PG; at approx. 60:20:20 by wt.) To final % NCO of 23.3% (liquid pure MDI variant)from ICI Americas Rubinate 7302: prepolymer of MDI and 4000 MW flexible polyether triol, NCO content=28% by weight Rubinate 7400: prepolymer of MDI and 2000 MW flexible polyether triol, NCO content=28% by weight Rubinate 8700: polymeric methylene diusocyanate (MDI) of NCO content=31.5% from ICI Americas Rubinate 9410: MDI isocyanate blend, number ave. functionality=2.3, 32.5% NCO by wt.

Stepanpol PS-4002: ortho-phthalate based polyester polyol with a hydroxyl value of 400 and a nominal functionality of 2.0 from Stepan Co.

SR-242 (NIAX L-5420): surfactant available from WITCO (OSi Corp.).

Suprasec DNR: polymeric MDI having 31.5% NCO content by wt., number ave. functionality=2.7 from ICI Tegostab B-8465: a polyether modified polysiloxane surfactant from Th. Goldschmidt Unitol DSR: Tall oil fatty acids (mixture of oleic and linoleic acids, in crude form); Acid No.191. Blowing agent, and IMR co-additive. Available from Union Camp.

COMPONENTS

The foams of the present invention are prepared from compositions which include a polyisocyanate, and an isocyanate reactive component that includes polyol, a blowing agent that includes carboxylic acid, catalyst, crosslinker, stabilizer. Each of these is described below.

Polyisocyanates

Any polyisocyanate previously used in the preparation of polyisocyanurate foams may be employed. Preferably, polyisocyanate has a viscosity(at 25° C.) of about 35 cps to about 400 cps, most preferably about 200 cps. Examples of useful polyisocyanates include aliphatic polyisocyanates, cycloaliphatic polyisocyanates, aralaliphatic polyisocyanates, aromatic polyisocyanates, and mixtures of isocyanates and polyisocyanates modified by introduction of at least one of urethane, allophanate, urea, biuret, carbodiimide, uretonimine, or isocyanurate residues. Organic polyisocyanates useful in the present invention include, for example, 1-6-hexamethylene diisocyanate, isophorone diisocyanate, cyclohexane 1,4-diisocyanate, 4,4'-dicyclohexyl methane diisocyanate, 1,4-xylylene diisocyanate, 1,4-phenylene diisocyanate, 2,4-toluene diisocyanate, 2,6-toluene diisocyanate, 4,4'-diphenylmethane diisocyanate (4,4'-MDI) 2,4'-diphenylmethane diisocyanate (2,4' MDI), polymethylene polyphenylene polyisocyanates (crude MDI) and 1,5-naphthylene diisocyanate.

The polyisocyanatecomponent is preferably an aromatic polyisocyanate. The aromatic polyisocyanates may be any of 4,4'-diphenylmethane diisocyanate, 2,4'-diphenylmethane diisocyanate, polymeric diphenylmethane diisocyanate, diphenylmethane diisocyanate variants, and mixtures thereof. More preferably, the aromatic polyisocyanate is an MDI composition of —NCO functionality of about 2.0 to about 3.0, still more preferably about 2.2 to about 2.7.

Polyol

The polyol is preferably a flexible polyether polyol based predominantly on propylene oxide, and preferably contains minor amounts of ethylene oxide as a cap. Useful polyols include flexible polyether diol/triols. An example of a useful flexible polyether polyol is ethylene oxide capped polyoxypropylene based polyol of number average MW of about 1500 to about 10,000 and number average functionality of about 1.5 to about 8.

Flexible polyols are preferably included in the isocyanate reactive component. The flexible polyether polyols are the single largest ingredient by wt. of the isocyanate reactive component. More preferably, the flexible polyol is present at greater than about 50% by weight of the isocyanate reactive component, still more preferably about 60 to about 85% by wt., and most preferably about 70 to about 80% by wt. based on the total isocyanate reactive component.

The flexible polyether polyols may be primary or secondary —OH terminated, preferably primary —OH terminated. Preferably, the flexible polyether polyols have a number average equivalent weight of about 1000. The equivalent weight range may extend from greater than about 300 to about 10,000 (number average), preferably greater than about 500 to about 2000; more preferably about 800 to about 1500; still more preferably about 900 to about 1200; and most preferably about 1000. The flexible polyether polyols employed have a number ave. functionality of from about 1.5 to about 8; preferably about 2 to about 4; more preferably about 2 to about 3; and most preferably about 2.5 to about 3. The ethylene oxide (EO) content of the flexible polyols is preferably present entirely as a cap although some EO may be in the main chain. The preferred EO cap level is about 5 to about 25%; more preferably about 8 to about 18%; and most preferably 9 to 10% (EO percentages by wt.). The flexible polyol is preferably employed as a single polyol, but a mixture of flexible polyols may also be employed.

Blowing Agent

Carboxylic acids are essential blowing agents in the present invention. Carboxylic acid anhydrides may be used but are less preferred. Carboxylic acids react with isocyanates to form $CO_2$ and an amide linkage. Carboxylic acids which may be employed in the invention include aliphatic, cycloaliphatic, aromatic and/or heterocyclic and may be substituted (e.g., with halogen atoms) and/or unsaturated. Examples of suitable carboxylic acids and anhydrides include succinic acid; adipic acid; suberic acid; azelaic acid; sebacic acid; phthalic acid; isophthalic acid; terephthalic acid; trimellitic acid; phthalic acid anhydride; tetrahydrophthalic acid anhydride; hexahydrophthalic acid anhydride; tetrachlorophthalic acid anhydride; endomethylene tetrahydrophtalic acid anhydride; glutaric acid anhydride; maleic acid; maleic acid anhydride; fumaric acid; monomeric, dimeric and trimeric fatty acids such as those of oleic acid which may be in admixture with monomeric fatty acids. Partial esters of polycarboxylic acids may also be used, such as terephthalic acid, mono-methyl ester, terephthalic acid ethylene glycol mono-ester and mixtures thereof.

Preferred carboxylic acids are liquid or soluble in the isocyanate-reactive component. Most preferred carboxylic acids are aliphatic carboxylic acids such as fatty mono, di, or tri-carboxylic acids having 10 carbon atoms or more, most preferably 16 carbons or more. Suitable carboxylic acids may include, for example, lauric, palmitic, ricinoleic, stearic acid, oleic acid, linoleic acid, linolenic acid, adipic acid, behenic acid, arachidic acid, montanic acids, isostearic acid, and like acids as well as mixtures thereof. Water can be employed with the carboxylic acid as a co-blowing agent.

Catalyst

In the formulations of the invention, the amount of catalyst can be varied to achieve desired processing and property characteristics as would be evident to the person of ordinary skill.

A wide variety of trimerization catalysts known to promote trimerization may be used. Preferred trimerization catalysts include soluble alkali metal carboxylates such as potassium 2-ethylhexoate, and potassium acetate, sodium acetate, sodium octoate, potassium octoate, tetra alkyl ammonium carboxylates, potassium hydroxide, most preferably potassium hydroxide with fatty acid with the acid in molar excess, i.e, more —COOH groups than KOH groups.

Co-catalysts may be used in combination with the trimerization catalyst. These additional catalysts include tertiary amines and esters of transition metals, especially fatty esters of tin optionally with alkyl groups attached to the tin atom. A preferred class of co-catalysts is fatty esters of bismuth, especially products available under the "Bicat" series from Shepherd Chemical. Another class of highly preferred co-catalysts are strongly basic amidines and guanidines which are free of isocyanate reactive (—NH) or $NH_2$ groups. A particularly preferred example is a cyclic aliphatic amidine known as Polycat DBU(diazabicycloundecene), from Air Products Co.

Crosslinkers and/or Chain-Extenders

Chain-Extenders and/or Crosslinkers such as DEG and glycerol may be included in the polyisocyanurate reactions systems of the invention. Chain-Extenders and/or Crosslinkers are typically minor constituents by weight of the overall isocyanate-reactive component formulation.

A catalyst carrier such as diethylene glycol (DEG) or dipropylene glycol (DPG)may be employed as a chain extender. However, where the trimerization catalyst is soluble in the resin (polyol or acid) component, a carrier is not needed.

A wide range of crosslinkers and chain extenders may be used. Useful chain extenders include diols of number average or absolute MW of up to about 300, preferably less than about 300, more preferably less than about 250. Examples of these diols include ethylene glycol, diethylene glycol, propylene glycol, dipropylene glycol, 1,4-butane diol and propylene glycol 400.

Suitable chain extenders may be selected from polyols such as oxyethylene or oxypropylene based diols having a molecular weight of up to about 600. Examples of other useful diols include 1,8, octane diol, neopentyl glycol, cyclo hexane dimethanol, 2-methyl-1,3-propane diol, 1,3-butanediol, 1,6-hexanediol, 1,5-pentane diol, and tripropylene glycol; aliphatic and aromatic amines, e.g., 4,4'-methylene dianilines having a lower alkyl substituent positioned ortho to each N atom.

Preferred crosslinkers are polyols of functionality about 3 to about 4, most preferably triols having a number average MW of about 250 or less. Glycerol is a very highly preferred crosslinker.

Stabilizer

Foam stabilizing surfactants also can be employed in the reactions systems of the invention. Useful foam stabilizing surfactants include but not limited to silicone-polyether copolymers. Examples of silicone-polyether copolymers which can be employed in the compositions of the invention include rigid foam surfactants such as Tegostab B-8465.

Other Additives

Other materials conventionally employed in the preparation of polyisocyanurate foams may be included as additives in the reaction systems of the invention. Particularly useful additives include internal mold release additives, preferably non-silicone internal mold release agents such as fatty acids, fatty esters, fatty polyesters, especially combinations of these.

Reinforcement materials can also be included in the reaction system. In general, the reinforcing material can be laid directly into the mold and the liquid foam composition poured thereon. However, alternatively or in addition thereto, chopped fibers and other fillers may be added to the isocyanate component of the system, the isocyanate reactive component, or both, in amounts up to about 70 weight percent of the SRIM part.

The fiber reinforcements preferably are included in the reaction systems of the invention. A wide range of amounts of fiber reinforcement may be included. Fiber materials may be woven, non-woven (random), or combinations thereof. Suitable fibers include synthetic fibers of nylon, polyester, aramide, polyether ketones, polyether sulfones, polyamides, silicon carbon, and the like; natural fibers such as cellulose, cotton, hemp, flaxes, and jute; and mineral or ceramic fibers including Wollastonite, aluminum, glass fibers, and carbon fibers. Glass fiber, either woven or non-woven, is the preferred reinforcement material due to its low cost and physical properties. One or more layers of fiber reinforcement may be used depending on the desired fiber weight. Preferably, these reinforcements are fiber reinforcement and/or mat reinforcement, more preferably glass fibers and/or glass mats. Mats (or long fibers) are particularly preferred. Mats of glass fibers are most preferred.

Preferably, the reinforcement material is greater than 0 to about 70% by weight, more preferably about 10% to about 50% by weight, and most preferably about 15% to about 40% by weight of the final part. Chopped fibers which have a length of about 12.5 mm to about 100 mm may also be used.

PREPARATION OF FOAMS

The polyisocyanurate foams preferably are prepared by reacting an isocyanate with an isocyanate reactive component that includes a polyol, an alkali metal carboxylate hydroxide trimerization catalyst, and a mono or poly carboxylic acid blowing agent in a high index formulation. In an alternative embodiment, the isocyanate reactive component may include carboxylic acids, crosslinkers, and/or chain extenders and be free of polyol.

The carboxylic acid-isocyanate amide reaction provides at least part of the foam forming expansion and helps promote trimerization. Optionally, water may be employed as a co-blowing agent with the carboxylic acid. Components are mixed to achieve an isocyanate index of about 200 to about 1500, preferably about 250 to about 700.

The isocyanate reactive component may include a single polyol or a blended polyol. It is preferred that most of the polyol(s) and additives are in the isocyanate reactive component. Additives also may be placed in the isocyanate component if chemically compatible with the isocyanate. The carboxylic acids and catalysts are included in the isocyanate reactive component.

When a polyol is employed, a portion of the polyol may be pre-reacted with isocyanate to form a quasi-prepolymer. In this embodiment, all or most of the polyol may be in the isocyanate quasi-prepolymer.

Although two component formulations are highly preferred, the invention may be practiced with formulations which have more than two components.

Processing-shaping of Foam Compositions

Preferably, the formulations of the invention are molded. However non-molded applications are possible with these compositions. Useful molding methods include LD-SRIM and fiber chopping techniques. LD-S-RIM uses glass mat reinforcements and fiber chopping techniques and uses high aspect ratio glass fibers and involve cutting the fiber-reinforcements and injecting them into the combined A-side and B-side components at the mix head.

Generally, the reactive components in the formulation are mixed and processed in amounts which provide for conformance to a desired foam density, index, and A:B ratios.

Details of how to mix the components of the formulation would be evident to those of ordinary skill in the art.

Polyisocyanurate foams prepared according to the invention have molded densities less than about 1.2 (spg). The preferred density is about 0.8 spg to about 0.1 spg, more preferably about 0.75 spg to about 0.2 spg, still more preferably about 0.7 spg to about 0.25 spg, most preferably about 0.6 spg to about 0.3 spg. If reinforcement is present, then the density is measured including the reinforcement.

The invention is illustrated but not limited by the following examples which relate to two component systems in which the A-side is isocyanate and the B-side is a blend of polyol(s), cross linkers, chain extenders, catalysts, blowing agents and other additives. In examples 1–9, unless otherwise indicated, a polyisocyanurate foam is prepared by hand mixing the various components shown in Table 1 and allowing the foams to free rise. The properties of the resulting foams are shown in Table 1.

As used hereinafter, Index means the ratio of NCO equivalents to total isocyanate reactive group equivalents multiplied by 100%.

A/B ratio means the weight ratio of isocyanate to isocyanate reactive components. This is the weight ratio at which the components of a two component system are mixed.

Cream time means the time, in seconds, from when A and B sides are first mixed until an initial increase in volume is noted.

Gel time means the time, in seconds, from when the A and B side are first mixed to produce a liquid mixture until the liquid mixture turns solid.

Tack Free time means the time, in seconds, from when the A and B sides are first mixed until the surface of the resulting foam is tack free to the touch.

End of rise time means the time, in seconds, from mixing until foam stops rising.

TABLE 1

| Example/Component | 1 | 1A | 2 | 3 | 4 | 5 | 6[1] | 7[2] | 8[1,2] | 9[1] |
|---|---|---|---|---|---|---|---|---|---|---|
| B-SIDE | | | | | | | | | | |
| Dabco K-15 | 2.5 | 2.5 | | | | 2.0 | | 2.25 | | |
| DEG | | | | | | | | | 7.5 | |
| Glycerine | 5.0 | 5.0 | | | | 5.0 | | 5.0 | | |
| Kemester 5721 | 0.86 | 0.86 | | | | 0.83 | | 0.44 | | 0.86 |
| Loxiol G71S | 7.7 | 7.7 | 7.5 | 7.5 | 7.5 | 7.5 | 7.5 | 4.0 | 7.5 | 7.5 |
| Niax L-1000 | | | | | | | | 2.0 | | |
| Niax L 5420 | | | | | | | | | 2.0 | |
| Niax L 6980 | | | | | | | | | | 3 |
| Polycat DBU | 0.5 | 0.5 | | | | | | | | |
| Poly G-55-173 | | | | | | 100 | | | | |
| Priolube 1414 | | | 0.83 | 0.83 | 0.83 | | 0.83 | | 0.83 | |
| Rubinol R-015 | | | | | 25 | | 30 | | | 30 |
| Rubinol R-180 | | | 55 | 55 | | | | | 65 | |
| Rubinol F-435 | | | | 45 | | | | | 35 | |
| Rubinol F 455 | 100.0 | 100.0 | | | 75 | | 70 | 100 | | 70 |
| Rubinol F 459 | | | 45 | | | | | | | |
| SR 24 | | | | | 2.0 | | | | | |
| Tegostab B-8465 | 2.0 | 2.0 | 2.0 | | 2.0 | 2.0 | 2.0 | | | |
| Unitol DSR | 7.7 | 7.7 | 7.5 | 7.5 | 7.5 | 7.5 | 7.5 | 15 | 7.5 | 7.5 |
| Aqueous KOH (50% H2O) | | | | | 0.6 | | | | | |
| Water | 1.5 | 1.5 | 0.5 | 0.55 | 0.7 | 1.35 | 0.6 | | 0.6 | 0.86 |
| KOH + Water(45 wt %)5 | | | | 0.9 | 0.85 | | | | | |
| KOH + Water(50:50 wt. %) | | | | | | | | 0.8 | 0.75 | 1.2 |

TABLE 1-continued

| Example/Component | 1 | 1A | 2 | 3 | 4 | 5 | 6[1] | 7[2] | 8[1,2] | 9[1] |
|---|---|---|---|---|---|---|---|---|---|---|
| A-SIDE | | | | | | | | | | |
| Rubinate 8700 | 305[3] | 405[3] | | | 214[3] | 226[3] | 355[3] | 533[3] | 200[3] | 500[3] |
| Rubinate 8700 | 1.50[4] | 2.0[4] | | | | | 2.25[4] | 1.8[4] | 1.7[4] | 3.37[4] |
| Suprasec DNR | | | 1.8 ± 0.2[4] | 1.8 ± 0.2[4] | | | | | | |
| Property | | | | | | | | | | |
| Cream time (Sec.) | 38 | 14 | | | | | 61 | 42 | 19 | 17.8 |
| gel time(Sec.) | 177 | 70 | | | | | 220 | 120 | 58 | 66.8 |
| tack free(Sec.) | 270 | 80 | | | | | 263 | 146 | 66 | |
| end of rise (Sec.) | 270 | | | | | | | | 79 | 84.2 |
| Hard time (Sec.) | | | | | | | 285 | 146 | 99 | 285 |

[1]Good foam appearance
[2]Machine reactivites
[3]Index
[4]A:B ratio
[5]45% KOH

Examples 6A–6F

The formulation of example 6 is repeated except that the A:B ratios and indexes are varied. The results are shown in Table 2

TABLE 2

| Sample No./Property | Index | A:B ratio | Cream Time[1] | Gel Time[1] | Tack Free Time[1] | Hardness Time[1] | Foam Appearance |
|---|---|---|---|---|---|---|---|
| 6A | 237 | 1.5 | 40 | 145 | 178 | 218 | Good |
| 6B | 284 | 1.8 | 45 | 158 | 188 | 212 | Good |
| 6C | 316 | 2 | 54 | 170 | 200 | 226 | Good |
| 6D | 355 | 2.25 | 56 | 190 | 225 | 250 | Good |
| 6E | 394 | 2.5 | 63 | 204 | 237 | 262 | Good |
| 6F | 473 | 3 | 75 | 250 | 285 | 305 | Good |

[1]Seconds

Examples 6G–6L

The formulation of example 6 is repeated except that the isocyanate, A:B ratios are held constant at 2.25 and indices are varied. The results are shown in Table 3

TABLE 3

| Sample No./Property | Isocyanate | Cream Time[1] | Gel Time[1] | Tack Free Time[1] | End of Rise[1] | Index | A:B ratio |
|---|---|---|---|---|---|---|---|
| 6G | Rubinate 8700 | 45 | 199 | 239 | 292 | 355 | 2.25 |
| 6H | Rubinate 7400 | 43 | 170 | 196 | 260 | 319 | 2.25 |
| 6I | Rubinate 1790 | 45 | 248 | 300 | 340 | 261 | 2.25 |
| 6J | Rubinate 7302 | 30 | 139 | 158 | 196 | 317 | 2.25 |
| 6K | Rubinate 1680 | 36 | 169 | 185 | 229 | 332 | 2.25 |
| 6L | Rubinate 9410 | 35 | 146 | 159 | 190 | 366 | 2.25 |

[1]Seconds

Example 10

This example illustrates use of an amine based polyol with acid blowing agent.

A-side

Rubinate 8700; Index 290; A:B ratio 1.8

| B-side | |
|---|---|
| Component | PBW |
| Rubinol F-455 | 57.99 |
| Jeffamine T-5000 | 8.39 |
| Rubinol R-015 | 14.48 |
| Glycerine | 3.62 |
| Unitol DSR | 6.06 |
| Loxiol G71S | 0.6 |
| Priolube 1414 | 0.07 |
| Tegostab B-8465 | 1.62 |
| 50% KOH + 50% Water | 0.78 |
| Water | 0.37 |

The reaction system is mixed for 7 seconds.
The resulting foam has:
 Cream Time=36 sec
 Gel Time=102 sec
 Tack free time=124 sec
 Hard time=142 sec
 Good foam appearance

Example 11

This example illustrates use of adipate polyester polyols in the B-side to prepare a free-rise polyisocyanurate foam. In this example, the B-side and A-side components are mixed for 25 seconds to produce a free rise polyisocyanurate foam using a potassium catalyst.

A-side

Rubinate 8700; Index=355; A/B=1.08

| B-side | |
|---|---|
| Component | PBW |
| Daltorez P-716 | 100.0 |
| 50% KOH + 50% $H_2O$ | 0.8 |
| Dabco 8800 | 2.0 |
| Tegostab B-8465 | 2.0 |
| Unitol DSR | 7.5 |
| Loxiol G71S | 7.5 |
| Priolube 1414 | 0.8 |
| Water | 0.8 |

Example 12

The procedure of example 11 is employed except that the mixing time is 15 seconds. The resulting blend is poured into a mold measuring 6 inch×inch×5/32 inch. The mold is maintained at 190° F. in a Carver press under a clamping force of 15,000 pounds to form a plaque. The composition is demolded at 2 min. 30 sec. The resulting polymer was extremely pliable upon demolding. After demolding, the part gained dimensional stability with time. Products produced using this composition would be useful as thermoformable parts that require significant flexibility.

Example 13

The system formulation shown below is formed into a plaque using the procedure of example 12 except that the system is mixed for ten seconds and demolding is done at 1 min. 45 sec.

A-side

Rubinate 8700; Index=355; A/B=1.45

| B-side | |
|---|---|
| Component | PBW |
| Daltorez P-716 | 100.0 |
| Ethylyne glycol | 3.0 |
| 50% KOH + 50% $H_2O$ | 0.8 |
| Tegostab B-8465 | 2.0 |
| Unitol DSR | 7.5 |
| Loxiol G71S | 7.5 |
| Priolube 1414 | 0.8 |
| Water | 0.8 |

The ethylene glycol improves rigidity of the polymer compared to example 12.

Example 14

The system formulation shown below is formed into a plaque using the procedure of example 12 except that the system is mixed for 13 seconds and demolding is done at 3 min. 45 sec.

A-side

Rubinate 8700 Index=355; A/B=2.94

| B-side | |
|---|---|
| Component | PBW |
| Daltorez P-716 | 100.0 |
| Ethylene glycol | 15.0 |
| 50% KOH + 50% $H_2O$ | 0.8 |
| Tegostab B-8465 | 2.0 |
| Unitol DSR | 7.5 |
| Loxiol G71S | 7.5 |
| Priolube 1414 | 0.8 |
| Water | 0.8 |

This system shows the rigidifying effect on impact of adding ethylene glycol. The plaque was even more rigid and less brittle than Example 13.

Example 15

This example illustrates use of ortho-phthalate polyester polyols in the B-side to produce a free-rise polyisocyanurate foam. The mix time is 12 seconds.

A-side

Rubinate 8700 Index=355; A/B=2.10

| B-side | |
|---|---|
| Component | PBW |
| Stepanpol PS-4002 | 100.0 |
| 50% KOH + 50% $H_2O$ | 0.8 |
| Tegostab B-8465 | 2.0 |
| Unitol DSR | 7.5 |
| Loxiol G71S | 7.5 |
| Priolube 1414 | 0.8 |
| Water | 0.8 |

This system shows superior surface cure.
The polyisocyanurate free rise foam has:
- Cream time=1 min. 16 sec.;
- gel time=1 min. 56 sec.;
- Tack free time=2 min. 15 sec.

Example 16

The system formulation shown below is formed into a plaque using the procedure of example 12 except that the system is mixed for 7 seconds and demolding is done at 3 min. 30 sec.

A-side

Rubinate 8700 Index=355; A/B=2.10

| B-side | |
|---|---|
| Component | PBW |
| Stepanpol PS-4002 | 100.0 |
| 50% KOH + 50% $H_2O$ | 0.8 |
| Tegostab B-8465 | 2.0 |
| Unitol DSR | 7.5 |

-continued

| B-side | |
|---|---|
| Component | PBW |
| Loxiol G71S | 7.5 |
| Priolube 1414 | 0.8 |
| Water | 0.8 |

The plaque shows superior dimensional stability compared to adipate polyesters.

Example 17

This example illustrates the use di-acids in the B-side as blowing agents to make polyisocyanurate foams. The mix time is 7 seconds.

A-side

Rubinate 8700 Index=270; A/B=2.33

| B-side | |
|---|---|
| Component | PBW |
| Rubinol F-436 | 70.0 |
| Rubinol R-015 | 30.0 |
| 50% KOH + 50% $H_2O$ | 0.8 |
| Tegostab B-8465 | 2.0 |
| Pripol 1013 | 7.5 |
| Loxiol G71S | 7.5 |
| Priolube 1414 | 0.8 |
| Water | 0.8 |

The polyisocyanurate foam has a:
  Cream time=21 sec.
  gel time=1 min. 27 sec.
  tack free time=2 min. 44 sec.

Example 18

This example illustrates use of tri-acids in the B-side as blowing agents to produce a free rise foam. The mix time is 7 seconds.

A-side

Rubinate 8700 Index=270; A/B=2.33

| B-side | |
|---|---|
| Component | PBW |
| Rubinol F-436 | 70.0 |
| Rubinol R-015 | 30.0 |
| 50% KOH + 50% $H_2O$ | 0.8 |
| Tegostab B-8465 | 2.0 |
| Pripol 1040 | 7.5 |
| Loxiol G71S | 7.5 |
| Priolube 1414 | 0.8 |
| Water | 0.8 |

The polyisocyanurate foam has a:
  Cream time=21 sec.
  gel time=1 min. 43 sec.
  Tack free time=2 min. 20 sec.

Examples 19 and 20 illustrate the reduced time for demolding of parts produced with the polyisocyanurate foam reaction systems of the invention. Example 19 shows the demold time with a polyurethane system. Example 20 shows the demold time with the polyisocyanurate reactions systems of the invention.

Example 19

Polyurethane System

| B-side | |
|---|---|
| Component | PBW |
| Rubinol RO15 | 100.0 |
| Glycerine | 7.5 |
| Polycat 8 | 3.5 |
| Dabco 8800 | 1.0 |
| Unitol DSR | 6.5 |
| Loxiol G71S | 10.0 |
| Kemester 5721 | 1.1 |
| Niax L-6980 | 1.5 |
| Water | 1.6 |

AB ratio=1.70 with Rubinate 8700
Index=105
Top & bottom mold temperatures=165° F.
Demold time=90 seconds

Example 20

Polyisocyanurate System of the Invention

| Component | PBW |
|---|---|
| Rubinol F-455 | 85.0 |
| Rubinol R-015 | 15.0 |
| Unitol DSR | 7.5 |
| Loxiol G71S | 7.5 |
| Priolube 1414 | 0.83 |
| Tegostab B-8465 | 2.0 |
| KOH + water | 0.65 |
| Water | 0.60 |

A:B ratio=1.80 with Rubinate 8700
Index=405
Top & bottom mold temperatures 180° F.
Demold time=55 seconds

What is claimed is:

1. A reaction system for forming structural reaction injection molded polyisocyanurate foams comprising: a reinforcement material, a polyisocyanate component, and a polyisocyanate reactive component including a polyol, blowing agent, and a trimerization catalyst, wherein the blowing agent consists of one or more carboxylic acids and optionally water.

2. The reaction system of claim 1 wherein the polyisocyanate component is selected from the group of aliphatic polyisocyanates, cycloaliphatic polyisocyanates, araliphatic polyisocyanates, aromatic polyisocyanates, and mixtures of isocyanates and polyisocyanates modified by introduction of at least one of urethane, allophanate, urea, biuret, carbodiimide, uretonimine, or isocyanurate residues.

3. The reaction system of claim 2 wherein the polyisocyanate component is an aromatic polyisocyanates selected from the group consisting of 4,4'-diphenylmethane diisocyanate, 2,4'-diphenylmethane diisocyanate, polymeric diphenylmethane diisocyanate, diphenylmethane diisocyanate variants and mixtures thereof.

4. The reaction system of claim 3 wherein the aromatic polyisocyanate is a diphenylmethane diisocyanate, polymeric diphenylmethane diisocyante or mixtures of diphenylmethane diisocyante and polymeric diphenylmethane diisocyante of —NCO functionality of about 2.0 to about 3.0 number average.

5. The reaction system of claim 2 wherein the carboxylic acid component is a substituted or unsubstituted carboxylic acid or partial ester thereof selected from the group consisting of saturated or unsaturated aliphatic carboxylic acids, aromatic carboxylic acids, heterocyclic carboxylic acids.

6. The reaction system of claim 5 wherein the carboxylic acid is an aliphaticcarboxylic acid.

7. The reaction system of claim 6 wherein the aliphatic carboxylic acid is selected from the group consisting of fatty mono, di, or tri-carboxylic acids having 10 carbon atoms or more.

8. The reaction system of claim 7 wherein the aliphatic carboxylic acid has 16 carbons or more.

9. The reaction system of claim 2 wherein the trimerization catalyst is selected from the group consisting of potassium hydroxide, potassium hydroxide with fatty acid, and soluble alkali metal carboxylates.

10. The reaction system of claim 9 wherein the soluble alkali metal carboxylate is selected from the group consisting of potassium 2-ethylhexoate, and potassium acetate, sodium acetate, sodium octoate, potassium octoate.

11. The reaction system of claim 9 wherein the trimerization catalyst is potassium hydroxide with a fatty acid.

12. A method for manufacturing foam products by the SRIM process, the improvement wherein the foam is produced from a reaction system comprising: a polyisocyanate component, and a polyisocyanate reactive component comprising a polyol, blowing agent, and a trimerization catalyst, wherein the blowing agent consists of one or more carboxylic acids and optionally water.

13. The method of claim 12, wherein the polyisocyanate component is selected from the group of aliphatic polyisocyanates, cycloaliphatic polyisocyanates, araliphatic polyisocyanates, aromatic polyisocyanates, and mixtures of isocyanates and polyisocyanates modified by introduction of at least one of urethane, allophanate, urea, biuret, carbodiimide, uretonimine, or isocyanurate residues.

14. The method of claim 13 wherein the polyisocyanate component is an aromatic polyisocyanates selected from the group consisting of 4,4'-diphenylmethane diisocyanate, 2,4'-diphenylmethane diisocyanate, polymeric diphenylmethane diisocyanate, diphenylmethane diisocyanate variants and mixtures thereof.

15. The method of claim 14 wherein the aromatic polyisocyanate is a diphenylmethane diisocyanate or polymeric diphenylmethane diisocyante of number average —NCO functionality of about 2.0 to about 3.0.

16. The method of claim 12 wherein the carboxylic acid component is a substituted or unsubstituted carboxylic acid or partial esters thereof selected from the group consisting of aliphatic carboxylic acids, aromatic carboxylic acids, heterocyclic carboxylic acids.

17. The method of claim 15 wherein the carboxylic acid is an aliphatic carboxylic acid.

18. The method of claim 17 wherein the aliphatic carboxylic acid is selected from the group consisting of fatty mono, di, or tri-carboxylic acids having 10 carbon atoms or more.

19. The method of claim 18 wherein the aliphatic carboxylic acid has 16 carbons or more.

20. A reaction system for forming structural reaction injection molded polyisocyanurate foams comprising:
    a reinforcement material;
    polyisocyanate and an isocyanate reactive component comprising,
        a complex fatty polyester that is the reaction product of adipic acid, pentaerythritol and oleic acid,
        an isobutyl ester of oleic acid
        a propoxylated glycerol,
        a triol,
        a polyether modified polysiloxane surfactant,
        a tall oil fatty acid, and
        potassium hydroxide.

21. The reaction system of claim 20 wherein the propoxylated glycerol has a hydroxyl value of 650.

22. The reaction system of claim 21 wherein the triol has a molecular weight of 3000.

23. The reaction system of claim 22 wherein the tall oil fatty acid is a mixture of oleic and linoleic acids.

24. The reaction system of claim 23 wherein the polyisocyanate is polymeric methylene diisocyanate.

25. A reaction product of the reaction system of claim 1.

* * * * *